United States Patent [19]
Aldrich

[11] 4,051,097
[45] Sept. 27, 1977

[54] CARBON METALLIC FRICTION COMPOSITION

[75] Inventor: Francis William Aldrich, Troy, N.Y.

[73] Assignee: The Bendix Corporation, South Bend, Ind.

[21] Appl. No.: 676,076

[22] Filed: Apr. 12, 1976

Related U.S. Application Data

[63] Continuation of Ser. No. 322,820, Jan. 11, 1973, abandoned, which is a continuation-in-part of Ser. No. 222,342, Jan. 31, 1972, abandoned.

[51] Int. Cl.$^2$ ............................................. C08K 3/04
[52] U.S. Cl. .................................. 260/38; 106/36; 260/DIG. 39
[58] Field of Search ............... 106/36; 260/DIG. 39, 260/38, 37 M

[56] References Cited

U.S. PATENT DOCUMENTS

| | | | |
|---|---|---|---|
| 3,007,890 | 11/1961 | Twiss et al. | 260/DIG. 39 |
| 3,210,303 | 10/1965 | Biggs | 260/DIG. 39 |
| 3,932,568 | 1/1976 | Watts | 106/36 X |

FOREIGN PATENT DOCUMENTS

| | | | |
|---|---|---|---|
| 717,133 | 8/1965 | Canada | 260/DIG. 39 |

*Primary Examiner*—Sandra M. Person
*Attorney, Agent, or Firm*—Leo H. McCormick, Jr.; William N. Antonis

[57] ABSTRACT

A composition for an automobile brake lining having a substantially uniform coefficient of friction up to 1000° F. The composition is primarily a mixture of metal or metal oxide particles, non-graphitic amorphous carbon particles, a thermosetting phenolic resin and an elastomer. At least five volume percent of the metal and non-graphitic amorphous carbon particles is in fiber form to provide structural stability to the composition upon curing the phenolic resin.

4 Claims, No Drawings

CARBON METALLIC FRICTION COMPOSITION

This is a continuation of application Ser. No. 322,820, filed Jan. 11, 1973 which was a continuation-in-part of application Ser. No.222,342 filed Jan. 31, 1972, both now abandoned.

BACKGROUND OF THE INVENTION

Conventional organic brake linings are made up of a mixture of organic binders, asbestos fibers and property modifiers. The organic binders usually include some resin that solidifies upon heating. The asbestos fibers, which strengthen the lining, remain relatively stable when subjected to thermal changes up to 800° F. However, asbestos deteriorates at higher temperatures due to loss of water, of crystallization and frictional wear.

Modifiers, varied in type and content, must also be added to provide a desired level of effectiveness with respect to wear resistance, fade resistance and noise.

However, when organic brake linings are exposed to high temperature such as that created by rapidly repeated frictional engagement over a period of time, the thermally unstable elements of the lining mixture undergo a chemical or structural change. Asbestos dehydrates and is eventually transformed into forsterite or olivine. Inorganic modifiers such as carbonates and sulfates decompose and the resin binder loses its stability. When organic elements in the brake lining decompose upon being subject to a high temperature environment, that portion of the decomposed element remaining upon termination of the high temperature is carbon. This created carbon is on the surface of the brake lining and has no adverse effect on the coefficient of friction of brake lining since it is not an integral bound part thereof. The extent of breakdown or wear of this type of organic lining is directly dependent upon the time and length of exposure to an elevated temperature.

Correspondingly in such an elevated temperature the coefficient of friction is generally reduced due to thermal degration of the organic component. This lowering of the coefficient of the material proportionally reduces the effectiveness in frictionally stopping.

Later as disclosed in U.S. Pat. No. 3,434,998 assigned to the common assignee of this application and incorporated herein by reference, the asbestos fiber of the organic brake lining was replaced with a metal fiber and fillings and graphite powder used as a friction modifier. The metal fiber and fillings can undergo reversible transformation from a solid to a liquid when subjected to a predetermined temperature about 1500° F. The graphite powder is thermally stable in this temperature range and as a result a structurally stable lining material can be produced. However, graphite has a low coefficient of friction necessitating the need for a surface area wherein the combined coefficient of friction graphite and metal fiber produces an overall coefficient of friction for the lining sufficient to bring a vehicle to a stop within a predetermined distance from 60 miles per hour. Normally, the graphite content in the lining material is greater than the metal fiber and filling. Increasing the graphite to metal fiber and filling ratio results in an overall lower coefficient of friction and performance; however, a material which wears better and internally absorbs the noise created by frictional engagement is produced.

Conversely, decreasing the graphite to metal fiber and filling ratio results in a higher coefficient of friction and performance. However, wear and noise is substantially decreased.

SUMMARY OF THE INVENTION

Through experimentation it has been determined that non-graphitic amorphous carbon as distinguished from graphite has a high coefficient of friction, a large capacity for absorbing thermal energy and a high compressive resistance. However, non-graphitic amorphous carbon has a low resistance to tension which is evidenced by shattering upon an impact force. In order to effectively utilize carbon in a brake lining, the non-graphitic amorphous carbon must be bound with a strengthening material.

I have devised a brake lining composition primarily composed of free non-graphitic amorphous carbon mixed with metal fiber and metal particles bound together by a thermosetting phenolic resin.

The molecular structure of the non-graphitic amorphous carbon in the mixture will remain substantially the same upon being subjected to the thermal energy capable of being generated by frictional engagement in an automobile wheel brake. Thus, the frictional coefficient of the brake lining will remain substantially constant upon engagement with another element in varying thermal environments.

It is therefore the object of this invention to provide a brake lining composition having a relatively stable coefficient of friction and high resistance to wear over a predetermined temperature range.

It is still a further object of this invention to provide a brake lining composition composed of non-graphitic amorphous carbon and metal particles bound together by a thermosetting resin.

It is another object of this invention to provide a carbon metallic brake lining unaffected by thermal decomposition.

These and other objects will become apparent to those skilled in the art from reading this specification.

DETAILED DESCRIPTION OF THE PREFERRED EMBODIMENT

Throughout this specification wherein the term carbon is used, the genus graphite is excluded. Carbon is amorphous or non-crystalline whereas graphite is that material formed by heating carbon to 2600° – 3000° C. The molecular structure of carbon at this temperature is arranged in an ordered pattern of stacked parallel planes rather than orginally randomly arranged atoms. Correspondingly, because of this ordered pattern, graphite has a lower coefficient of friction than the original carbon.

When a vehicle is moving down a long incline, it is often necessary to momentarily apply the brakes. In applying the brakes, brake lining in each wheel frictionally engages another member to reduce the rotary motion of the wheels. Upon frictional engagement, thermal energy is created as the drum or disc slides on the brake lining. As thermal energy in the brake lining and drum or disc increases, a corresponding decrease in the coefficient of friction between these members will result and can be recorded as fade. Through my invention of using a carbon metallic lining the repetitive fade essentially approaches a straight line.

The composition of my carbon metallic lining is a mixture of non-graphitic carbon particles such as No. 98 carbon produced and available from Avico Speer Carbon Products, St. Mary's, Pa., from 10–75 volume percent of the total mixture and metal or metal oxide particles preferably iron, steel, and copper particles from 10-55 volume percent of the total mixture bound together by a phenolic thermosetting resin such as RD-25 Oil Modified Dry Powder Phenolic Resin produced and available from The Bendix Corporation, Troy, N.Y.

From 5-20 volume percent of the metal or metal oxide particles used should be in fiber form to provide structural stability and tensile strength to the overall composition. In some instances modifiers such as graphite, inorganic wear filler, metal oxides and elastomers to control noise and wear may be beneficial. A typical composition according to my invention shown in the following example displayed good fade, wear and a substantial uniform coefficient of friction over a wide range of temperatures.

EXAMPLE I

| Ingredient | Volume % of Total |
|---|---|
| Carbon | 45 |
| Powdered Iron | 25 |
| Steel Fiber | 10 |
| Phenolic Resin | 20 |

The ingredients in Example I are thoroughly mixed together and placed in a cold preformed mold to establish a measured amount of the composite in a predetermined shape. The composite is then transferred to a refining mold in the shape of a brake lining where the temperature is slowly raised causing the phenolic resin to become pliable. A compressive force is then placed on the composite causing the resin to form a holding matrix by flowing around the other ingredients in the composite. The density of the resulting composite is directly dependent upon intensity of the compressive force applied to the heated composite. The composite remains in this heated refining mold until the phenolic resin has begun to cure. When curing has proceeded sufficiently that a stable composite results, the molded composite is transferred to an oven where the temperature is increased to complete curing of the resin.

Brake lining, manufactured in accordance with the above teaching, represents an advance over the prior art by providing a material with substantially the same friction effectiveness or coefficient of friction under varying conditions of operation.

The following Table I lists the relative comparative results of the lining composition above with conventional brakes on a vehicle required to be successfully stopped from 60 mph. at 15 ft./sec. 10 times in lap 1 and 15 times in lap 2 on a track of 0.4 mile intervals over a set period of time.

TABLE I

| | LAP #1 | | LAP #2 | | | |
|---|---|---|---|---|---|---|
| | 1st Fade | | 2nd Fade | | | |
| | 10 Stops | | 10 Stops | | 15 Stops | |
| | Brake Line Pressure #/in.$^{-2}$ | Temp. °F | Brake Line Pressure #/in.$^{-2}$ | Temp. °F | Brake Line Pressure #/in.$^{-2}$ | Temp. °F |
| Organic | 1200 | 700° | 760 | 620° | 740 | 700° |
| Semi Metallic | 950 | 640° | 750 | 520° | 850 | 600° |
| Carbon Metallic | 1050 | 666° | 950 | 670° | 1120 | 740° |

In the above Table I, the coefficient of friction for the different brake linings is inversely proportional to the brake line pressure created by substantially equal input forces.

In organic brake lining during the second fade, the coefficient of friction is substantially increased with a corresponding change in the production of thermal energy. If the production of thermal energy is permitted to continue, the organic lining will be destroyed.

The semi-metallic lining shows a more uniform overall coefficient of friction than the organic lining without a frictional peak during the second fade reducing the possiblity of self destruction.

The carbon metallic lining shows a still more uniform coefficient of friction than either the organic or semi-metallic linings within the thermal energy range produced by consecutive repetitive stops in the above tests. Thus, the carbon metallic lining has less tendency to self destruct than other brake lining since the production of thermal energy remains relatively constant.

In some instances it has been found that noise is produced upon frictional engagement of carbon-metallic members. To attenuate this noise, from 0-10% weight by volume of an elastomer is added to the composite ixture in Example I. The elastomer modifies the composite sufficiently to reduce the noise but is insignificant to the overall total material and therefore does not affect the coefficient of friction of the resulting material.

I claim:
1. A composition for an automobile brake lining having a substantially uniform coefficient of friction upon frictional engagement with another member up to 740° F., said composition consisting of metal or metal oxide particles from 15-55 volume percent of the total composition, non-graphitic amorphous carbon particles from 10-75 volume percent of the total composition, an elastomer from 0-10 volume percent of the total composition and an organic resin from 15-35 volume percent of the total composition, said organic resin holding the metal or metal oxides, the non-graphic amorphous carbon particles and the elastomer together, said elastomer attenuating noise created by frictional engagement of the brake lining, said amorphous carbon and metal or metal oxide together forming the friction producing material to create said uniform coefficient of friction.

2. The composition as recited in claim 1 wherein said 15-55 volume percent of metal or metal oxide particles includes at least 5 volume percent of metal fiber to provide structural stability to the total composition.

3. The composition as recited in claim 2 wherein said organic resin is a thermosetting phenolic resin.

4. The composition as recited in claim 3 wherein said metal or metal oxide is selected from the group consisting of iron, copper, steel, iron oxide and mixtures thereof.

* * * * *